United States Patent Office 3,449,328
Patented June 10, 1969

3,449,328
EXTRACTION OF SAPOGENINS FROM
VEGETABLE MATERIALS
Roland Hardman, Beeston, England, assignor to National
Research Development Corporation, London, England,
a British corporation
No Drawing. Continuation-in-part of application Ser. No.
587,432, Oct. 18, 1966. This application Aug. 3, 1967,
Ser. No. 658,052
Claims priority, application Great Britain, Aug. 16, 1966,
36,711/66
Int. Cl. C07c *167/40, 173/06*
U.S. Cl. 260—239.55                20 Claims

ABSTRACT OF THE DISCLOSURE

Saturated hydrocarbons containing at least 6 carbon atoms in the molecule are used in the working up of sapogenin-affording plants e.g. Dioscorea, Balanites and Trigonella, to increase the recoverable yield of sapogenin. The hydrocarbon, particularly 2,6,10,15,19,23-hexamethyltetracosane, is preferably added before or after incubation of the plant material with added water and the sapogenin then recovered by the usual methods.

---

This application is a continuation-in-part of copending application Ser. No. 587,432 filed Oct. 18, 1966.

This invention relates to the extraction of saponins and sapogenins from vegetable materials.

Sapogenin yielding vegetable materials are grown in many parts of the world and the sapogenins which can be extracted from them are of considerable commercial significance as they can be used as starting materials for the manufacture of various biologically active steroid compounds, particularly corticosteroids. Sapogenins normally occur in the vegetable material in the form of saponins in relatively small amounts, e.g. about 2% and much study has been given to the problem of their efficient extraction. Various forms of pre-treatment of the vegetable material have been devised with a view to increasing the amount of available sapogenin material or increasing extraction efficiency, for example, by allowing the vegetable material to ferment prior to extraction or comminuting the material to break down the cell walls as much as possible.

It has now been found that the amount of sapogenins recovered can be increased if the vegetable material is pre-treated with certain saturated hydrocarbons. These may participate in the sapogenin-yielding system, as, for example, carriers of metabolites or enzymes across membranes, or as potentiators or regulators of biological changes and may assist with the release of sapogenin-affording material. The hydrocarbons may also participate themselves in biosynthesis which leads directly or indirectly to the formation of sapogenin.

In a process for recovering steroidal saponins and sapogenins from steroidal sapogenin-affording vegetable materials, the present invention comprises the step of treating the vegetable material piror to recovery of the saponin or sapogenin with a saturated hydrocarbon containing at least six carbon atoms in the molecule. The sapogenins may then be preferably recovered directly from the vegetable material by subjecting the treated vegetable material to the action of a substance capable of hydrolysing glycosidic linkages and removing the sapogenins from the hydrolysate product.

Alternatively the sapogenins may be recovered from the vegetable material by subjecting the treated vegetable material to extraction with a saponin solvent such as methanol, hydrolysing the glycosidic linkages in the extract and removing the sapogenins from the hydrolysate product.

The hydrocarbon preferably contains at least 10 carbon atoms in the molecule and in the case of straight chain hydrocarbons may be solid at room temperature, that is to say, contains more than about 16 carbon atoms in the molecule, and good results have been obtained using straight chain hydrocarbons containing 24 to 36 carbon atoms in the molecule. In the case of branch chain hydrocarbons, the branches preferably contain not more than 3 carbon atoms, e.g. methyl, and the chains preferably contain 9 to 24 carbon atoms. Suitable hydrocarbons include n-hexane ($C_6H_{14}$), n-hexadecane ($C_{16}H_{34}$), n-heneicosane ($C_{21}H_{44}$), n-tetracosane ($C_{24}H_{50}$), cyclohexyleicosane ($C_6H_{11} \cdot C_{20}H_{41}$), n-dotriacontane ($C_{32}H_{66}$), n-hexatriacontane ($C_{36}H_{74}$), heptamethyl-n-nonane, 2-methyl-n-octadecane, tetramethyl-n-pentadecane and squalane (2,6,10,15,19,23-hexamethyl-n-tetracosane). Mixtures of such hydrocarbons may also be used, such mixtures being available from animal, plant and mineral sources.

The present process is particularly concerned with the recovery of sapogenins from materials derived from the monocotyledonous materials at present used as commercial sources of sapogenins, for example, leaves, corms, rhizomes, tubers or roots in the families Dioscoreaceae, Liliaceae and Amaryllidaceae and more particularly from various Dioscorea such as *D. sylvatica, D. composita, D. floribunda, D. mexicana, D. tokoro, D. deltoidea* and other genera such as Tamus, Aletris, Asparagus, Similax, Trillium, Yucca. The present process is also applicable to the recovery of sapogenins from dicotyledonous materials, for example those in the Leguminosae, Balanitaceae and Zygophyllaceae families, and particularly seeds and fruits derived from the genera Trigonella, Trifolium and Balanites, such as *Trigonella foenumgraecum, Trigonella coerulea, T. corniculata, T. cretica, Trifolium ornithopodiodes* and *Balanites aegyptiaca* (*B. roxburghii*), *B. orbicularis, B. pedicellaris* and *B. wilsoniana.*

Pre-treatment by incubation has already been proposed for certain sapogenin-affording monocotyledonous vegetable materials by maintaining the vegetable material in the presence of an added aqueous medium for a suitable period of time, often at an elevated temperature. Such pre-treatment may advantageously be included in the process of the present invention and it has been found that if this incubation is carried out, e.g. for 1–30 days, in the presence of added hydrocarbon the over-all yield of sapogenins ultimately recovered can be increased. Part of the increased yield is almost certainly due to the incubation itself but comparison with control experiments shows that part of the increased yield is clearly attributable to the presence of the saturated hydrocarbon. Even when the hydrocarbon is not introduced until the vegetable material is subjected to hydrolysis, the amount of recoverable sapogenins is increased compared to control extractions where hydrocarbon is omitted. When this last mentioned alternative is adopted the vegetable material may first be incubated in the presence of an added aqueous medium, e.g. for 1–30 days, and then treated with hydrocarbon and subjected to hydrolysis or the incubation pre-treatment step may be omitted altogether.

The hydrocarbon may be added as such, for example as a purified chromatographic grade chemical or as a less pure grade or as a mixture, possibly in the form of animal, vegetable or mineral material. Enzymes participating in the biosynthesis and release of sapogenins and their precursors may also be added. These may take a form of an animal or plant tissue of cell free extracts from these tissues or of isolated enzymes.

The amount of hydrocarbon to be added to the vegetable material depends on several variables, i.e. the nature and conditions of the vegetable material and the pretreatment and extraction conditions, but since residual hydrocarbon can readily be recovered from the sapogenin product, the use of an amount in excess of requirements is not necessarily uneconomic. It has been found that very useful results can be obtained using up to about 50% w./w. based on the dry weight of the vegetable material, and, more particularly, about 5–20% w./w. based on the dry weight when powdered material is being used and about 25–50% w./w. when fresh material is being used.

Tuber vegetable material to be subjected to pre-treatment may be broken up to some extent to ensure that the liquids present have ready access to all portions of the material and in the case of tubers, for example, the tuber may be sliced thinly, comminuted so that some cells are broken, comminuted so that many cells are broken, or sliced, dried and then powdered. As an additional or alternative pre-treatment, the vegetable material may be incubated with degrading enzymes such as cellulase or pectinase, this is believed to assist in bringing the hydrocarbon and later the hydrolysing agent into contact with as many of the cells as possible. When enzyme pretreatment is adopted, enzyme pre-treatment and the incubation mentioned above are best carried out simultaneously and the hydrocarbon may be introduced at any stage in the incubation period.

When one of the dicotyledonous materials, e.g. a seed, is to be pre-treated it is preferred to avoid comminution of the seed as described in more detail in our co-pending application Ser. No. 587,432. It may be convenient however to break up large seeds, e.g. Balanites, into smaller pieces.

The incubation step is preferably carried out adding a sufficient quantity of water so that there is a separate aqueous phase present at the end of the incubation. This mixture is maintained preferably at an elevated temperature, e.g. 25–40° C. or even 80° C., and in the presence of added hydrocarbon as described above. It is found that the ultimate yield of sapogenins recovered is dependent on the time of this incubation stage and the temperature at which it is carried out and that, for example, where one species is concerned, the yield after one day's incubation at 37° C. might be double the yield after three days' incubation. Some preliminary experimentation is therefore necessary to establish the optimum incubation period and temperature for the particular species concerned as this same fluctuation of yield with incubation time and temperature is found when incubation is carried out in the presence of hydrocarbon.

The recovery of sapogenins from the treated product may conveniently be carried out by treating the product with a mineral acid to hydrolyse the glycosidic linkages, for example, an incubation product may be heated, e.g. up to reflux temperature, with 2 N hydrochloric acid for up to about 5 hours when the sapogenins, which are acid-insoluble, are released. Other non-oxidising mineral acids such as sulphuric acid may also be used in this hydrolysis step as may other acid materials such as acid salts. The acid-insoluble material may then be separated from the hydrolysate, e.g. by filtration or centrifugation and the sapogenins recovered by extracting the acid free acid-insoluble residue with a sapogenin solvent such as petroleum ether.

The present process is particularly applicable to the extraction of sapogenins such as diosgenin from species of Dioscorea, Trigonella and Balanites and the following examples are given to illustrate the process (the diosgenin products obtained are a mixture containing diosgenin together with its epimer yamogenin).

EXAMPLE 1

Fresh tubers of *Dioscorea floribunda* are sliced, dried and powdered and mixed to give a homogeneous sample of powdered tuber containing 7.2% moisture. 5.07 g. of this powder is incubated with 100 ml. distilled water at 36° C. for twenty-four hours. 1.0 ml. squalane (gas chromatography grade) is then added and concentrated hydrochloric acid to adjust to 2 N and the mixture boiled to reflux for two hours. The acid-insoluble material is filtered off and washed with water before the residue is made alkaline with dilute sodium carbonate solution and washed with water again. The solid is then dried at 80° C. for sixteen hours. This dried material is extracted with light-petroleum (B.P. 46–60° C.) in a Soxhlet apparatus for twenty-four hours and the solvent removed to leave a residue of crude diosgenin. The crude diosgenin is dissolved in carbon disulphide and assayed using an infra-red spectrophotometer at 980 cm.$^{-1}$ and the total sapogenin, calculated as diosgenin, found to be 3.9% of the powdered tuber calculated on a moisture free basis (M.F.B.).

This result represents an increase of 29% against results from a comparable extraction in which squalane was omitted from the hydrolysis stage, an increase of 15% over a comparable extraction in which the incubation stage was omitted, an increase of 12% over a comparable extraction in which squalane was present during the incubation step and an increase of 7% over results from a comparable extraction in which the incubation step and treatment with squalane were omitted.

EXAMPLE 2

Fresh tubers of *D. sylvatica* are sliced and the portions distributed amongst several batches. A batch, 34.6 g., having a moisture content of 85.3% is added to a mixture of 2 ml. squalane (gas chromatography grade) and 100 ml. 1 N hydrochloric acid which have been mixed for thirty seconds in a macerator. The acid, squalane and sliced tubers are then disintegrated for two minutes in the macerator and the mixture made up to 200 ml. with 2 N hydrochloric acid and then adjusted with concentrated hydrochloric acid so that the whole mixture is 2 N. This mixture is refluxed for two hours and the acid insoluble residue recovered and extracted with light-petroleum as described in Example 1. The crude sapogenin is dissolved in chloroform and assayed on an infra-red spectrophotometer indicating a sapogenin content in the tuber of 2.15% M.F.B. calculated as diosgenin. This result represents an increase of 41% on results obtained in a comparable extraction in which squalane was omitted.

EXAMPLE 3

Another batch of *D. sylvatica* tuber, 23.4 g., is added to a mixture of 2 mls. squalane and 100 mls. tap water which have been mixed in the macerator as described in Example 2. The tubers are then disintegrated for two minutes in the macerator and the mixture set aside in an incubator for twenty-four hours at 37° C. The incubated mixture is then treated with hydrochloric acid as described in Example 2, and the sapogenin extracted from the acid insoluble residue with light-petroleum as described in Example 1. The crude sapogenins are assayed as in Example 2 and a total sapogenin content in the tuber of 3.80% M.F.B. is found. This represents an increase of 23% on the results of a comparable extraction in which squalane was omitted.

EXAMPLE 4

Example 3 is repeated using a further batch of *D. sylvatica* tuber, 29.9 g., incubating the tuber with water and squalane for three days at 37° C. The total sapogenin content of the tuber is assayed as described above and a result of 2.94% M.F.B. is obtained which represents an increase of 23% on results of a comparable extraction in which squalane was omitted.

EXAMPLE 5

2.5 g. powdered *D. deltoidea* (moisture content 5.5%) is added to a 250 ml. conical flask and 25 ml. tap water added together with squalane (ordinary grade) when used, and the mixture shaken for five minutes. A further 25 mls. of tap water is added to wash down the inside of the flask which is then plugged and the incubation is carried out in the dark at 37° C. When squalane is added after the incubation period, the mixture is shaken for five minutes before the acid is added for the hydrolysis step. The acid-insoluble residue is collected and washed with water and then 5% ammonia solution, dried at 60° C. for 16 hours and extracted in a Soxhlet apparatus with light-petroleum (B.P. 40–60° C.) for 16 hours, solvent is removed from the extract to give a crude diosgenin which is assayed in chloroform using an infra-red spectrophotometer. The recovered product is also assayed by a densitometric thin layer chromatographic procedure using a Chromoscan recording and integrating densitometer (Table I/3). This gives slightly lower figures than the infra-red assay because the diosgenin is fully separated from other compounds.

The following procedures are used:

(A) No incubation, direct acid hydrolysis for two hours in 2 N hydrochloric acid.

(C) Incubation with hydrocarbon, in water at 37° C. in the dark, followed by acid hydrolysis as in A.

(D/b) Incubation as in C but without hydrocarbon; hydrocarbon added *before* acid for hydrolysis as in A.

(D/a) Incubation as in C but without hydrocarbon; hydrocarbon added *after* acid but before refluxing as in A.

The following results are obtained using ordinary grade squalane. The percentage increase indicated represents the percentage increase of the highest assay recorded compared to each of the other five assays in that section. Procedure C always gives the highest assay.

TABLE I/1

| Exp. No. | Procedure | Additive squalane (ml.) | Incubation time (hours) | Sapogenin assay (percent M.F.B.) 900 cm.$^{-1}$ | Percent increase of No. 4 |
|---|---|---|---|---|---|
| 1 | A | 0 | 0 | 4.51 | 21 |
| 2 | C | 0 | 24 | 5.04 | 8 |
| 3 | C | 0.25 | 24 | 5.31 | 3 |
| 4 | C | 0.50 | 24 | 5.46 | 0 |
| 5 | D/b | 0.50 | 24 | 4.90 | 12 |
| 6 | D/a | 0.50 | 24 | 4.88 | 12 |

TABLE I/2

| Exp. No. | Procedure | Additive squalane (ml.) | Incubation time (hours) | Sapogenin assay (percent M.F.B.) 900 cm.$^{-1}$ | Percent increase of No. 8 |
|---|---|---|---|---|---|
| 1 | A | 0 | 0 | 4.15 | 20 |
| 7 | C | 0 | 48 | 4.76 | 14 |
| 8 | C | 0.25 | 48 | 5.42 | 0 |
| 9 | C | 0.50 | 48 | 4.80 | 13 |
| 10 | D/b | 0.50 | 48 | 4.43 | 22 |
| 11 | D/a | 0.50 | 48 | 4.90 | 11 |

TABLE I/3

| Exp. No. | Procedure | Additive squalane (ml.) | Incubation time (hours) | Chromoscan | Percent increase of No. 15 |
|---|---|---|---|---|---|
| 12 | A | 0 | 0 | 4.54 | 32 |
| 13 | C | 0 | 72 | 5.03 | 19 |
| 14 | C | 0.25 | 72 | 5.50 | 11 |
| 15 | C | 0.50 | 72 | 5.99 | 0 |
| 16 | D/b | 0.50 | 72 | 5.07 | 18 |
| 17 | D/a | 0.50 | 72 | 4.33 | 38 |

EXAMPLE 6

The procedures described in Example 1 are repeated using 5.0 g. portions of powdered tubers of *D. speculiflora* and an incubation temperature of 37° C.

The crude diosgenin is assayed by the infra-red technique in carbon disulphide at 980 cm.$^{-1}$. The following results are obtained using ordinary grade squalane. The percentage increase indicated represents the percentage increase of Experiment 4 assay compared to each of the other assays recorded. (In procedure B/a procedure A is followed but squalane is added *after* the acid and the mixture then refluxed.)

TABLE 1B

| Exp. | Procedure | Additive ml. squalane | Incubation time (hours) | Sapogenin yield (percent M.F.B.) 980 cm.$^{-1}$ | Percent increase of Exp. 4 |
|---|---|---|---|---|---|
| 1 | A | 0 | 0 | 4.31 | 10 |
| 2 | B/a | 0.50 | 0 | 4.23 | 12 |
| 3 | C | 0 | 72 | 4.47 | 6 |
| 4 | C | 0.50 | 72 | 4.72 | 0 |
| 5 | D/a | 0.50 | 72 | 4.56 | 4 |
| 6 | D/b | 0.50 | 72 | 4.50 | 5 |

EXAMPLE 7

Dry tubers of *D. deltoidea* are powdered to pass a B.S.S. No. 8 sieve and 100 g. of this powder (moisture content 5.5%) is placed in a 2 l. conical flask with 300 ml. tap water and 20 ml. ordinary grade squalane. The mixture is hand shaken for five minutes and the sides of the flask washed down with a further 300 ml. tap water. When incubation is to be used the flask is set aside at this point. Afterwards 130 ml. concentrated hydrochloric acid is added to give a 2 N mixture which is refluxed for two hours. The acid-insoluble residue is collected and washed with water and then 5% ammonia until the residue is alkaline. The solid is then dried at 60° C. for sixteen hours and powdered to pass a B.S.S. No. 10 sieve. The powder is extracted in a Soxhlet apparatus with light-petroleum (B.P. 40–60° C.), 1.2 g. for 48 hours (to exhaustion). The extract is then set aside at room temperature for sixteen hours and white crystalline diosgenin collected, washed with light petroleum and dried for weighing. By T.L.C. examination this is not less than 98% pure. A second crop of off-white diosgenin is obtained from the bulked mother liquor and washings by concentrating it to a volume of 200 ml. The second crop is not less than 95% pure diosgenin. This procedure enables a gravimetric assay to be carried out and to show that using a hydrocarbon additive in this way enables an increased amount of diosgenin to be actually recovered as a crystalline product. Procedures A and C as defined in Example 5 and B/b are carried out with the following results. (In procedure B/b, procedure A is followed but squalane is added *before* the acid and the mixture then refluxed.)

| Experiment | Procedure | Additive | Incubation time (hrs.) | Sapogenin yield 1st crop | Sapogenin yield 2d crop | Sapogenin percent M.F.B. | Percent increase of 4 |
|---|---|---|---|---|---|---|---|
| 1 | A | 0 | 0 | 2.83, M.P. ° C. 209 | 0.86, M.P. ° C. 207–6 | 3.91 | 47 |
| 2 | B/b | 20% v./w. | 0 | 2.78, M.P. ° C. 210 | 0.69, M.P. ° C. 201–2 | 3.68 | 56 |
| 3 | C | 0 | 72 | 3.58, M.P. ° C. 210 | 0.99, M.P. ° C. 207–8 | 4.84 | 18 |
| 4 | C | 20% v./w. | 72 | 4.53, M.P. ° C. 211 | 0.87, M.P. ° C. 210–11 | 5.73 | 0 |

The percent increase represents the percent increase of the yield in Exp. 4 over the yield obtained in each of the other procedures.

EXAMPLE 8

A powdered straight chain hydrocarbon (250 mg.) is placed in a 250 ml. conical flask and 2.5 g. powdered *D. deltoidea* tubers added followed by 50 ml. tap water. The flush is swirled for 1 minute to mix the contents, plugged with cotton wool ready for incubation or hydrolysis procedures A, B/b and C as defined in Examples 5 and 7 are carried out and the following results obtained by the Chromoscan densitometric method. The percentage increases represent the percentage increase of the highest assay with each hydrocarbon compared to each of the other five assays obtained using the same hydrocarbon.

| Experiment | Procedure | Additive (mg.) | Incubation time (hr.) | Chromoscan Sapogenin yield (percent M.F.B.) | Percent Increase of No. 4, 9, 11, respectively |
|---|---|---|---|---|---|
| (a) n-Tetracosane (n-$C_{24}H_{50}$): | | | | | |
| 1 | A | 0 | 0 | 4.50 | 24 |
| 2 | B/b | 250 | 0 | 4.46 | 25 |
| 3 | C | 0 | 24 | 5.44 | 3 |
| 4 | C | 250 | 24 | 55.9 | 0 |
| 5 | C | 0 | 48 | 5.45 | 3 |
| 6 | C | 250 | 48 | 4.73 | 18 |
| (b) n-Dotriacontane (n-$C_{32}H_{66}$): | | | | | |
| 1 | As above | | | | 25 |
| 7 | B/b | 250 | 0 | 4.36 | 29 |
| 3 | As above | | | | 4 |
| 8 | C | 250 | 24 | 5.26 | 7 |
| 5 | As above | | | | 4 |
| 9 | C | 250 | 48 | 5.63 | 0 |
| (c) n-Hexatriacontane (n-$C_{36}H_{74}$): | | | | | |
| 1 | As above | | | | 39 |
| 10 | B/b | 250 | 0 | 4.98 | 26 |
| 3 | As above | | | | 15 |
| 11 | C | 250 | 24 | 6.25 | 0 |
| 5 | As above | | | | 15 |
| 12 | C | 250 | 48 | 4.51 | 39 |

NOTE.—Exp. Nos. 1, 3 and 5 were started on the same day. All others were started 3 days later.

EXAMPLE 9

50 ml. of tap water and 1 ml. squalane (2,6,10,15,19,23-hexamethyltetracosane) is added to 5 g. of whole *T. foenum-graecum* (fenugreek) seed. The mixture is placed in 500 ml. conical flask plugged with cotton wool, and subjected to continuous light at approximately 240 lumens/sq. ft. at room temperature (20–23° C.) with continuous aeration by shaking to encourage germination. After twenty-four hours the radial shows an elongation of 2–3 mm. beyond the micropyle.

The incubated product is treated with hydrochloric acid, and the dried acid-free acid-insoluble material extracted with light-petroleum (B.P. 40–60° C.) for 24 hours as described in Example 5 and the product worked up to give the sapogenin which is assayed by infra-red analysis. The advantageous effect of incubating with squalane in this manner is shown in the table following Example 9 where the control experiments are carried out in exactly the same way but without using squalane.

EXAMPLE 10

50 ml. of tap water with 0.5 ml. squalane are added to 5 g. of whole fenugreek seed and the mixture incubated in darkness at 37° C. for twenty-four hours to discourage subsequent germination. A further 0.5 ml. squalane is then added and the mixture subjected to the light and shaking conditions as described in Example 9. No elongation of the radical was obvious even up to 96 hours aeration.

The incubated product is treated with hydrochloric acid and the acid insoluble material extracted as described in Example 9 and assayed by infra-red analysis. The advantageous effect of incubating with squalane in this manner is shown in the following table where the control experiments are carried out in exactly the same way but without using squalane.

| | Aeration time in hours at 20–23° C. (after 24 hours incubation at 37° C. in the case of Example 10) | Total sapogenin by I.R. analysis percent M.F.B. | | |
|---|---|---|---|---|
| | | Control without squalane | With squalane | Percent increase |
| Example 9 | 6 | 1.75 | 1.99 | 14 |
| Do | 12 | 1.77 | 2.03 | 14 |
| Do | 24 | 1.75 | 2.01 | 15 |
| Example 10 | 48 | 1.39 | 1.77 | 27 |
| Do | 72 | 1.43 | 1.77 | 24 |
| Do | 96 | 1.61 | 1.92 | 19 |

EXAMPLE 11

1 ml. squalane is added to 5 g. whole Moroccan fenugreek seed and shaken by hand for two minutes. 50 ml. of tap water are then added and the mixture incubated in the dark at 37° C. for six, twenty-four or forty-eight hours (procedure A). The components are mixed thoroughly by shaking mechanically for fifteen minutes after the first three hours of the six hour incubation period and after the first four hours in the other two cases. These conditions discourage germination of the seed. The incubated product is treated with hydrochloric acid and sapogenins extracted from the acid-insoluble residue as described in Example 9. The sapogenins are assayed by infra-red analysis. Further experiments are carried out in which the same volume of squalane is introduced after adjusting the mixture to 2 N with hydrochloric acid and before boiling under reflux for two hours (precedure B) or squalane is omitted altogether (procedure C). Total sapogenin assays are shown below as percent M.F.B.

| Incubation time, hours | Procedure A, percent | Procedure B, percent | Procedure C, percent |
|---|---|---|---|
| 6 | 2.75 | 2.32 | 1.90 |
| 24 | 2.55 | 2.17 | 1.86 |
| 48 | 2.42 | 2.04 | 1.79 |

EXAMPLE 12

Seeds from freshly cracked *Balanites aegyptiaca* nuts are crushed in a mortar to give broken seed (80% of which is retained by a No. 30 sieve, B.S. 410) which is defatted with light-petroleum (B.P. 40–60° C.) for one hour in a Soxhlet extractor at a rate of twenty siphons per hours. Solvent is removed from the defatted seed by heating at 50–75° C. in an air stream oven.

Procedure A 5 g. of this defatted material is hand shaken with 100 ml. sterile tap water for one minute, 1 ml. squalane is added under aseptic conditions and the mixture hand shaken for one further minute. The mixture is then incubated at 37° C. in the dark for six hours and the incubated product hydrolysed with hydrochloric acid and the sapogenins extracted from the acid insoluble residue as described in Example 1. The sapogenins are assayed by infra-red analysis.

Procedure B

Incubation is omitted in this procedure. 5 g. of the defatted materal is hand shaken for one minute with 122 ml. 2 N hydrochloric acid, 1 ml. of squalane is added, the mixture hand shaken for a further minute and the hydrolysis and extraction procedure A above then followed.

Procedures C and D

Procedures B and A, respectively, are followed, but no squalane is included in the mixture.

The infra-red assay results are shown below as total sapogenin percent M.F.B.

| Procedure: | Percent |
|---|---|
| C (no incubation, no squalane) | 1.60 |
| B (no incubation, squalane present) | 1.75 |
| D (incubation, no squalane) | 1.00 |
| A (incubation, squalane present) | 2.17 |

I claim:

1. In a process for recovering steroidal saponins and sapogenins from steroidal sapogenin-affording vegetable materials the step of treating the vegetable material prior to the recovery of the saponin or sapogenin with a saturated hydrocarbon containing at least six carbon atoms in the molecule.

2. A process according to claim 1 in which the hydrocarbon is a straight chain hydrocarbon containing at least 16 and preferably 24–36 carbon atoms in the molecule.

3. A process according to claim 1 in which the hydrocarbon is a branch chain hydrocarbon containing 1–3 carbon atoms in a branch and 9–24 carbon atoms in the straight chain.

4. A process according to claim 2 in which the hydrocarbon is n-tetracosane, n-dotriacontane or n-hexatriacontane.

5. A process according to claim 3 in which the hydrocarbon is squalane (2,6,10,15,19,23-hexamethyltetracosane).

6. A process according to claim 1 in which the hydrocarbon is present in an amount up to 50 w./w. based on the dry weight of the vegetable material.

7. A process according to claim 6 in which the vegetable material is treated in a dried powdered form and the hydrocarbon is present in an amount of 5–20% w./w. based on the dry weight of the vegetable material.

8. A process according to claim 6 in which the vegetable material is treated in a fresh hydrated form and the hydrocarbon is present in an amount of 25–50% w./w. based on the dry weight of the vegetable material.

9. A process according to claim 1 in which the vegetable material is a monocotyledonous material is derived from the Dioscoreaceae, Liliaceae or Amaryllidaceae family.

10. A process according to claim 9 in which the vegetable material is at Dioscorea tuber.

11. A process according to claim 1 in which the vegetable material is a dicotyledonous material derived from the Leguminoscae, Balanitaceae or Zygophyllaceae family.

12. A process according to claim 11 in which the vegetable material is a Trigonella or Balanites seed.

13. A process according to claim 1 in which the sapogenin is recovered by subjecting the material to the action of a substance capable of hydrolysing glycosidic linkages to give a hydrolysate containing sapogenin.

14. A process according to claim 1 in which the vegetable material is incubated in the presence of an added aqueous medium and the incubated product subjected to acid hydrolysis, the hydrocarbon being present in the incubation mixture during incubation or being added to the incubation mixture after incubation but before acid hydrolysis.

15. A process for recovering diosgenin from diosgenin-affording tubers of the genus Dioscorea by incubating the tuber in the presence of an added aqueous medium and subsequently subjecting the incubated material to acid hydrolysis, in which the tuber is treated with a saturated hydrocarbon, containing at least sixteen carbon atoms in the molecule, prior to acid hydrolysis.

16. A process according to claim 15 in which the tuber is incubated in the presence of squalane (2,6,10,15,19,23-hexamethyltetracosane) and the incubated product heated with hydrochloric acid to give a hydrolysate containing diosgenin.

17. A process according to claim 15 in which the tuber is incubated, squalane (2,6,10,15,19,23-hexamethyltetracosane) added to the incubated product and the mixture then heated with hydrochloric acid to give a hydrolysate containing diosgenin.

18. A process for extracting steriodal saponins or sapogenins from steriodal sapogenin-affording seeds which comprises treating the seed in an uncomminuted form with squalane (2,6,10,15,19,23-hexamethyltetracosane) and subsequently treating the seed with a saponin solvent to give a solution of saponin or with a substance capable of hydrolysing glycosidic linkages to give a hydrolysate containing sapogenin.

19. A process according to claim 18 in which the seed is derived from *Trigonella foenum-graecum* and is incubated in the presence of squalane and an added aqueous medium prior to recovery of saponin or sapogenin.

20. A process for extracting diosgenin from seeds of *Trigonella foenum-graecum* which comprises incubating the uncomminuted seed at up to 40° C. for up to 7 days in the presence of squalane (2,6,10,15,19,23-hexamethyltetracosane) and an added aqueous medium treating the incubated product with a diluted hydrochloric acid and extracting the acid-free acid-insoluble residue with a diosgenin solvent to provide a solution of diosgenin.

References Cited

UNITED STATES PATENTS 3,010,955  11/1961  Chapman et al.

ELBERT L. RUBERIS, *Primary Examiner.*